United States Patent
McWilliams

[15] 3,651,378
[45] Mar. 21, 1972

[54] TRANSIENT PROTECTION SYSTEM FOR AVIONICS EQUIPMENT

[72] Inventor: Charles R. McWilliams, 15 Patriot Lane, Willingboro, N.J. 08046

[22] Filed: May 21, 1970

[21] Appl. No.: 39,360

[52] U.S. Cl. ..................................317/31, 317/50, 340/248 E, 340/250
[51] Int. Cl. ......................................................H02h 3/22
[58] Field of Search..................317/31, 13, 50; 340/248 E, 340/250

[56] References Cited

UNITED STATES PATENTS

| | | | |
|---|---|---|---|
| 3,312,889 | 4/1967 | Gold | 317/31 X |
| 3,550,110 | 12/1970 | Mayer | 340/248 E |
| 3,412,392 | 11/1968 | Jenkins et al. | 317/31 X |

OTHER PUBLICATIONS

Silicon Zener Diode and Rectifier Handbook, Sept., 1964, (pp. 75-80) 2nd edition; Motorola Inc. (AU 212)

*Primary Examiner*—James D. Trammell
*Attorney*—Morton C. Jacobs

[57] ABSTRACT

The operation of electric motors and other inductive loads in the electric system of an aircraft induces high energy transients that tend to damage the transistors and other semiconductors in the aircraft's avionic equipment. These damaging effects are cumulative and tend to reduce the effective life of such components. Such transients may have peak values of hundreds of volts and several amperes of current. An energy absorbing device in the form of a reverse-characteristic diode is connected in series with a fuse, and the series combination is connected between the power bus and ground. This diode conducts at high transient voltages and effectively absorbs the energy of such transients and diverts the damaging effects thereof from the avionic semiconductors.

3 Claims, 2 Drawing Figures

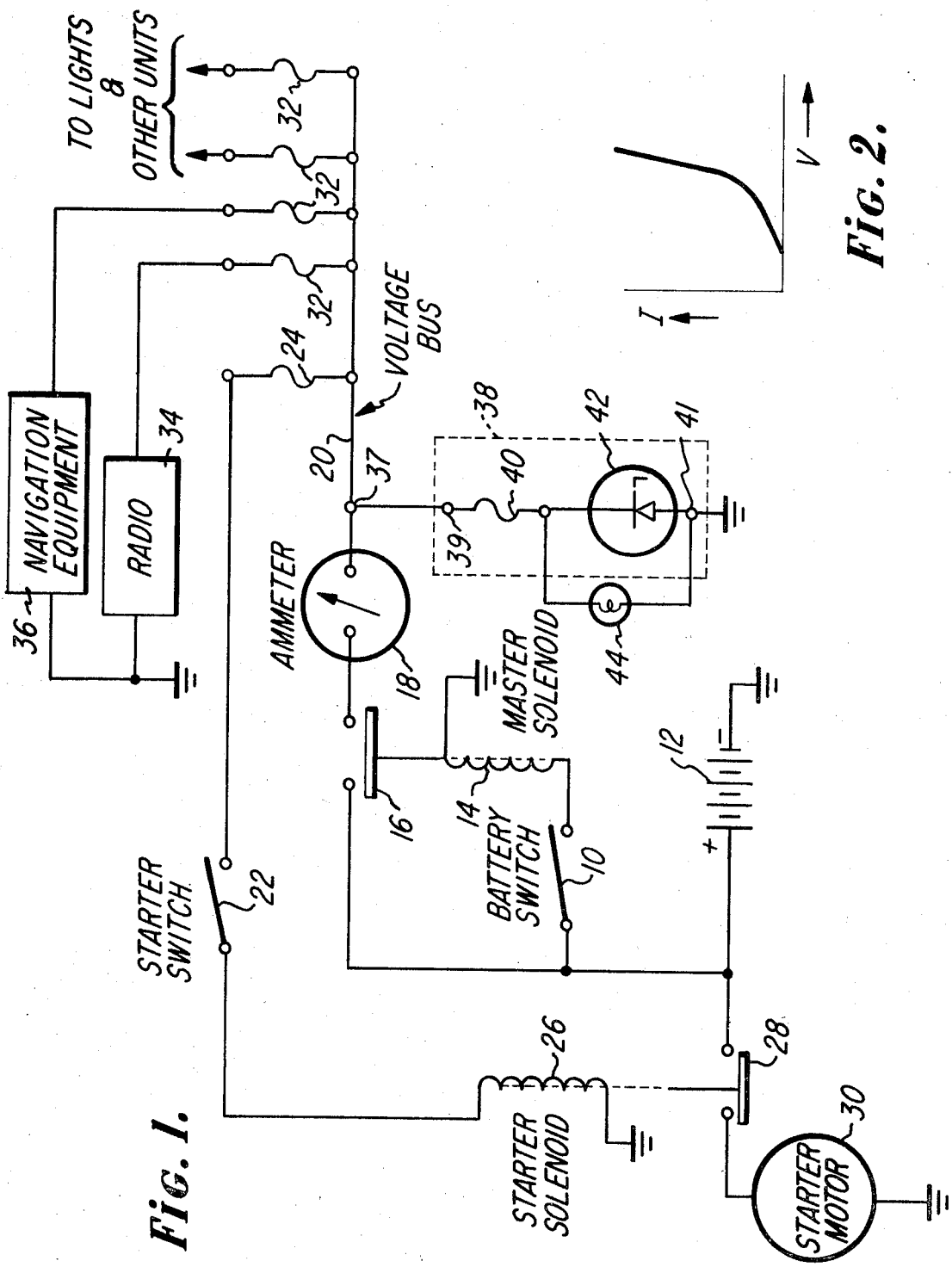

TRANSIENT PROTECTION SYSTEM FOR AVIONICS EQUIPMENT

BACKGROUND OF THE INVENTION

This invention relates to a protective system for avionics equipment and particularly to such a system for protecting electrical transients that tend to shorten the useful life of such equipment.

Each time the aircraft's pilot starts its engine, operates motors for electrical flaps, electric trim, landing gear, electrical fuel pump, or even the master solenoid, voltage transients are generated in the electric lines of an aircraft. These transients can, and frequently do, damage valuable radio equipment. In addition, when an electric motor or solenoid in the aircraft is switched off, the collapsing magnetic field generates a series of high voltage transients. The voltage bus bar of the aircraft's electrical system receives the energy contained in the collapsing field, and the induced transients, it has been found, may typically reach 100 to 200 volts (and several amperes of current), and transients up to 1,000 volts peak have been measured on a nominal 12 volts direct current bus. Characteristically, the induced transients from the inductive loads consisted of high frequency damped oscillations, decaying with a time constant of the order of tens of milliseconds. These transients may exceed the specifications of electronic components such as transistors and other semiconductors used in electronic equipment such as the radio, navigation equipment, strobe light circuits, etc. It has been found that the damage to these transistors and other semiconductors is not readily correlated since the damaging effects are not catastrophic, but rather are in the nature of a gradual degradation of these components resulting in a substantially reduced useful life.

While the aircraft is on the ground, damage to the electronic equipment can be prevented by disconnecting it from the power bus during the switch of loads inducing these transients; the starter motor and the master relay are in this category. However, such disconnection of the avionics equipment may often be inconvenient and undesirable while on the ground, and while in flight there may be a number of inductive loads that will be switched on and off concurrently with use of the avionics equipment; examples of such induction loads are the gear retraction, electric flaps, and flashing lights. Attempts to reduce the transients by the use of bypass capacitors connected from the DC bus to ground tends to be ineffective since, though the high frequency of the transients is reduced, the damped wave envelope is only partially reduced.

SUMMARY OF THE INVENTION

Accordingly, it is among the objects of this invention to provide a new and improved protective system for suppressing transients in the electrical power line of an aircraft to prevent injury to avionics equipment.

Another object is to provide a new and improved electrical protective system for absorbing high energy transients induced by the use of electric equipment in aircraft.

In accordance with one form of this invention, a protective system for avionic equipment is provided to absorb the high energy transients induced by the operation of various electric motors and solenoids that are part of the electrical apparatus of an aircraft. A selenium diode having a nonlinear reverse characteristic is connected in series with a fuse, and the series combination is connected from the voltage bus of the aircraft to ground. It has been found that such a diode is effective to absorb such voltage transients and thereby to reduce the high voltage surges on the line that otherwise tend to damage the avionic equipment. High energy transients that occur on the line are effectively reduced with a concomitant improvement in the normal life of the semiconductor components of the avionics equipment. A series fuse is provided to protect against failure of the reverse-characteristic diode.

BRIEF DESCRIPTION OF THE DRAWING

The foregoing and other objects of this invention, the various features thereof, as well as the invention itself, may be more readily understood from the following description when read together with the accompanying drawing, in which:

FIG. 1 is a schematic circuit diagram of a portion of the electric power system of an aircraft incorporating the protective system of this invention; and FIG. 2 is an idealized graphical diagram of the characteristic of a diode employed in the circuit.

DESCRIPTION OF A PREFERRED EMBODIMENT

Part of the electrical power system of a small, general type of aircraft is indicated schematically in FIG. 1. A battery switch 10 when closed connects the battery 12 to a master solenoid 14 which operates a switch 16 to connect the battery via switch 16 and an ammeter 18 to a power bus 20. A manual starter switch 22 connects a starter solenoid 26 via a fuse or circuit breaker 24 to the bus 20. The energization of the starter solenoid 26 operates a switch 28 to connect the starter motor 30 to the battery. Also connected to the bus 20 via fuses or circuit breakers 32 are electronic equipments such as a radio 34 and navigation equipment 36. Flashing lights and wing lights are similarly connected to the bus 20 as are other solenoid and motor operated devices such as those for flaps, landing gear, etc., (these devices are omitted from the drawing for simplicity of illustration).

A unit 38 for protection of the bus 20 against transients has terminals 39, 41 that are connected between a terminal 37 of that bus and ground terminal. The protective unit 38 includes the series combination of a fuse 40 and a suppressor diode 42, the anode of which is connected to ground. This diode is a form of selenium rectifier and has a sharp, nonlinear characteristic of current versus voltage of the reverse type, as indicated in FIG. 2. The diode has a high reverse resistance up to voltages of about 50 volts, at which it breaks down and permits the passage of several amperes of current at relatively low resistances. The diode has a fast transient voltage response and a high energy dissipation. One suitable form of such a diode is known as a "thyrector" diode.

Operation of either of the solenoids 14 and 26 or the starter motor 30, or of other motors or solenoids (not shown) results in a high voltage, high energy transient on voltage bus 20. Voltages up to hundreds of volts (e.g., peaks of 1,000 volts) have been observed together with currents of as much as 10 to 100 amperes. These transients are induced by the changing magnetic fields resulting from operation of the solenoids or motors. These transients far exceed the normal battery voltage e.g., 12 or 24 volts) and their high energies are applied to the transistors and semiconductors employed in the radio 34 and navigation equipment 36, and any other avionic equipment that may be employed. These transients tend to produce small damage areas in the semiconductors of the avionic equipment, especially under conditions of high temperatures such as those occurring in warm weather. This damage is sometimes of a nature to immediately destroy a transistor, but more often it is cumulative and tends to substantially decrease the useful life of such semiconductor components.

It has been found that the damaging effect of such transients is substantially reduced by the use of the protection unit 38. The unit breaks down at the high voltage of the transient and provides a relatively low resistance path to ground for the transient current. The diode substantially absorbs the energy in the transient and diverts the damaging effect from the semiconductors of the radio and navigation equipment. The fuse 40 protects against failure of the diode 42.

In practice, a single diode has been employed for a 12-volt battery supplying the voltage bus 20 of an aircraft power system. The dynamic breakdown voltage of the diode is about 50 volts. Two such diodes in series are suitable for a 24-volt battery supply, and the dynamic breakdown voltage is about 70 volts.

The diode 42 has some inherent shunt capacitance which tends to pass high frequency components to ground. It may be desirable to provide additional bypass capacitance by connecting a capacitor across the diode, which capacitor would be a more effective bypass for the high frequency components.

The protective unit 38 is generally applicable in a wide variety of electric power configurations in aircraft. It is constructed with the diode 42 in a casing that may be secured to any suitable framing member and a pair of leads and terminals so that it may be simply connected between the power bus terminal 37 and ground terminal. It is not dependent upon the type of solenoid or motor equipment that is employed nor upon the configuration of avionic or other electrical equipment connected to the voltage bus.

If desired, as indicating lamp 44 may be connected across the diode 42, which lamp (e.g., a small 12-volt incandescent lamp) is normally lit whenever power is supplied to the voltage bus 20. If the diode 42 is ever damaged sufficiently to burn out the fuse 40, this condition is indicated by the indicating lamp being turned off.

Thus, in accordance with this invention, a new and improved protective system is provided for an aircraft electrical system to prevent damage to avionic equipment from high energy transients produced by normal operation of motors or solenoids in aircraft.

What is claimed is:

1. In combination with an aircraft electrical system having one or more motors and transistorized avionic equipment connected between a power bus and ground;
    a protective device for absorbing high energy transient pulses induced on said power bus by operation of said motor, said protective device comprising:
        a selenium diode having a nonlinear reverse characteristic; and means for connecting said diode between said bus and ground; whereby damaging effects of said transients on the transistors of said avionic equipment are substantially reduced.

2. A protective device in combination with an aircraft electrical system as recited in claim 1,
    and further comprising a fuse connected with said diode in a series combination;
    said connecting means being arranged to connect said series combination between said bus and ground.

3. A protective device in combination with an aircraft electrical system as recited in claim 1,
    and further comprising a lamp connected across said diode for indicating a failure of said diode.

* * * * *